July 6, 1965  R. C. WOLF ETAL  3,192,953
CHECK VALVES
Filed Dec. 18, 1961

INVENTORS
ROBERT C. WOLF
JOHN C. BOWEN
BY
ATTORNEY

United States Patent Office 3,192,953
Patented July 6, 1965

3,192,953
CHECK VALVES
Robert C. Wolf, Hatboro, and John C. Bowen, Davisville, Pa., assignors to Pressure Products Industries, Inc., Hatboro, Pa., a corporation of Pennsylvania
Filed Dec. 18, 1961, Ser. No. 160,024
3 Claims. (137—614.19)

This invention relates to check valves and more particularly to check valves for use as inlet and discharge valves on compressors, pumps, and the like.

It is the principal object of the present invention to provide a check valve construction for compressors, pumps or the like which is particularly suitable for compressors operated at high pressures and with high compression ratios.

It is a further object of the present invention to provide a check valve construction for compressors, pumps and the like which is particularly suitable for use with diaphragm pumps in which the diaphragm is directly operated or is operated by an interposed liquid link.

It is a further object of the present invention to provide a check valve construction which can be readily packed for preventing fluid leakage and which is compact and free from likelihood of difficulties in use.

It is a further object of the present invention to provide a check valve construction which is suitable for pumps, compressors or the like and which may, if desired, be used for vacuum operation or for pressure operation as desired.

Other objects and advantageous features of the invention will be apparent from the description and claims.

The nature and characteristic features of the invention will be more readily understood from the following description, taken in connection with the accompanying drawings forming part thereof, in which.

It should, of course, be understood that the description and drawings herein are illustrative merely, and that various modifications and changes may be made in the structure disclosed without departing from the spirit of the invention.

Like numerals refer to like parts throughout the several views.

Figure 1:
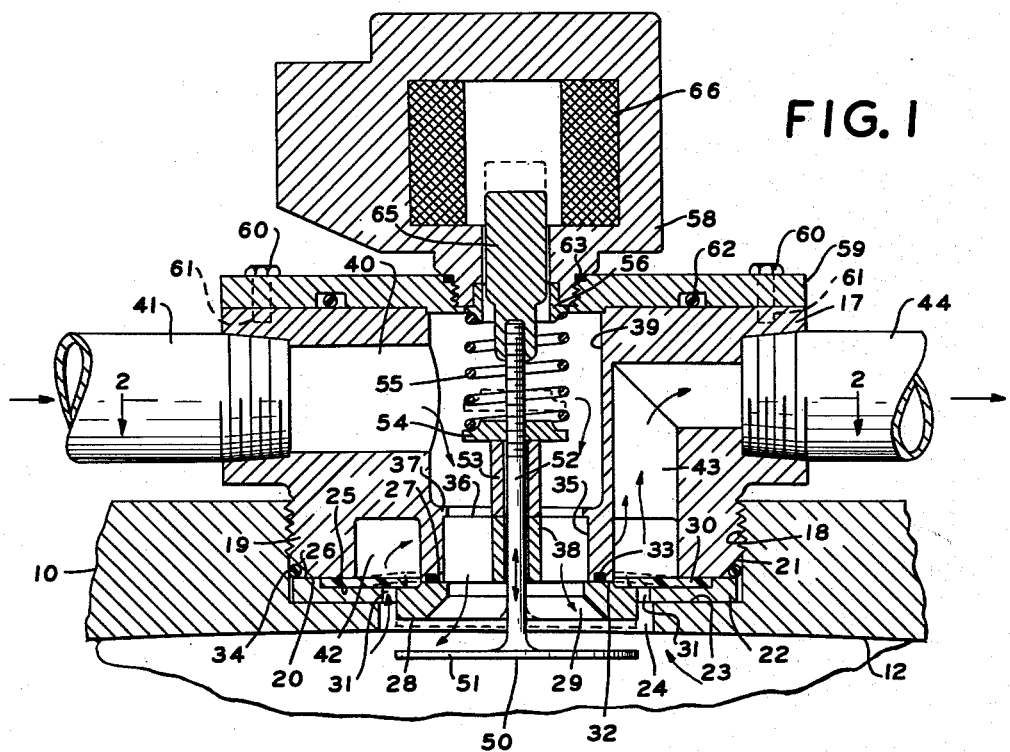
FIGURE 1 is a vertical sectional view of a check valve in accordance with the present invention, and taken approximately on the line 1—1 of FIG. 2.
Figure 2:
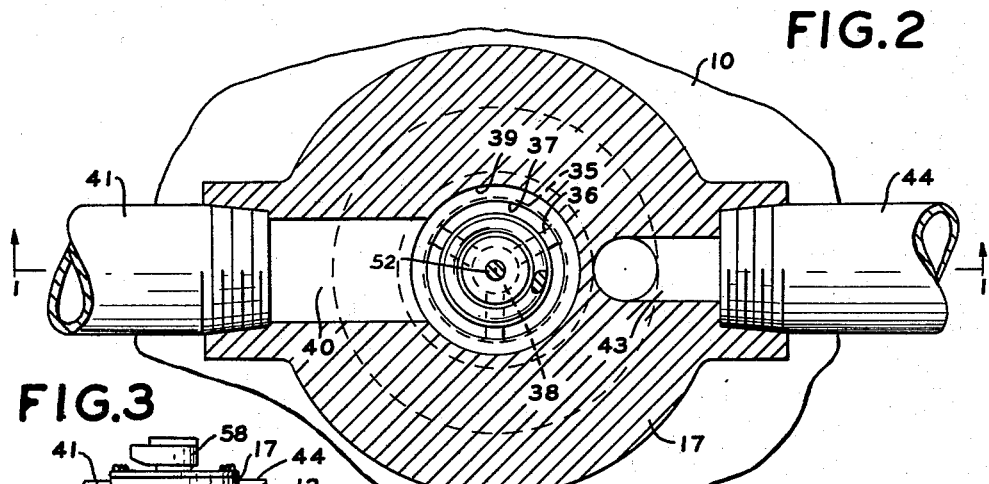
FIG. 2 is a horizontal sectional view taken approximately on the line 2—2 of FIG. 1.
Figure 3:
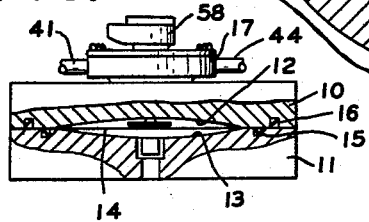
FIG. 3 is a view partly in elevation and partly in section illustrating a portion of a compressor or pump for which the check valves of the present invention are particularly suited.

Referring now more particularly to the drawings, a compressor or pump of the diaphragm type is illustrated in FIG. 3 in which a pair of heads 10 and 11 are provided with dished or concaved faces 12 and 13 therebetween. The heads 10 and 11 have a pump diaphragm 14 interposed therebetween for movement in the space between the faces 12 and 13, and annular packings 15 and 16 can be provided in the heads 10 and 11 surrounding the free portion of the diaphragm 14 and in engagement therewith for preventing fluid leakage. The lower side of the diaphragm 14, as shown in FIG. 3, can have a pulsating pressure fluid applied thereagainst as shown in our prior application for patent, filed March 17, 1960, Serial No. 15,573, now Patent No. 3,052,188, for moving the diaphragm 14 toward and away from the dished face 12 of the head 10. The dished face 12 of the head 10 can, if desired, have grooves thereon but the present invention is not limited to such a construction.

The check valve construction in accordance with the present invention is preferably located at the center of the head 10 for purposes to be explained, and can be carried in and by a removable valve housing 17. For this purpose the head 10 is provided with an internally threaded central opening 18 for the reception of a complementally threaded cylindrical body portion 19. The body portion 19 has an inwardly facing outer annular end face 20 and a chamfered edge 21 to engage in part a valve ring 22 which abuts against a shoulder 23 provided at the inner end of the opening 18 and surrounding a central opening 24 of reduced diameter extending from the opening 18 through the head 10 and to the dished face 12 in communication with the working chamber in the head 10 and above the diaphragm 14.

The valve ring 22 has an annular recess 25 in the outer face thereof, surrounded by an outwardly facing outer annular shoulder 26 and an outwardly facing inner annular shoulder 27.. The valve ring 22 has an inwardly facing annular shoulder 28, the shoulders 27 and 28 having a central opening 29 therein.

The recess 25 has a valve disc 30 of suitable flexible material, such as rubber, natural or synthetic, seated therein for controlling the flow through a plurality of openings 31 which connect the recess 25 with the working space in the interior of the head 10.

The valve ring 22 is held in position by an inwardly facing inner end face 32 in engagement. The face 32 has an end annular groove therein for the reception of a packing member 33 such as an O-ring, which engages the inner shoulder 27 of the valve ring 22 for preventing fluid leakage at this location.

The valve ring 22 at the outer part thereof is also held in position by the face 20 in engagement therewith and a packing ring 34, such as an O-ring is preferably interposed between the chamfered edge 21 and the ring 22 for preventing fluid leakage at this location.

The body portion 19, at a central opening 35 therein is provided with a spider 36 restrained against outward movement by an inwardly extending rim 37 and carrying a guide sleeve 38. The opening 35 is in communication with a longitudinally axially aligned bore 39 in the body portion 19 from which a passageway 40 extends for the connection of a fluid inlet pipe 41 for the delivery of the fluid to be introduced into the working chamber.

The valve body 19 has an annular passage 42 providing a fluid space above the valve disc 30 and has a passageway 43 extending through the body portion 19 to a fluid delivery connection 44 for fluid delivery discharge.

A movable valve member 50 is provided having a cloture plate 51 for closing the central opening 29 from which an integral stem 52 extends through the guide sleeve 38.

Within the central passageway 29 and the bore 39 in the body portion 19, a valve stem stop sleeve 53 is provided through which the valve stem 52 extends. A spring abutment 54 in threaded engagement with the valve stem 52 is limited in its movement in one direction by the stop sleeve 53. The spring abutment 54 has one end engaged by a compression spring 55, the other end of the spring 55 being in engagement with an abutment 56 which is mounted in a valve body closure 58. The valve body closure 58 is in threaded engagement with a valve body closure plate 59 which is secured to the body portion 19 in any desired manner such as by bolts 60, extending into blind threaded openings 61 in the body portion 19. A packing member 62 such as an O-ring, can be provided in a groove in the plate 59 and engaging the body portion 19 for preventing fluid leakage at this location. A packing member 63 such as an O-ring, can be provided in a groove in the plate 59 which is engaged by the valve body closure 58 for preventing fluid leakage at this location.

While the valve member 50 can be normally opened during the suction portion of the cycle by the spring 55, if desired the valve stem 52 may have an armature 65 in threaded engagement thereon. The armature 65 is disposed within the interior of an electromagnetic coil 66 within the valve body closure 58, the coil 66 being energized in any desired manner and in timed relation to the operation of the pump diaphragm 14.

In use the valve closure plate 51 is moved to open position during the suction portion of the cycle by the force exerted by the coil spring 55 on the valve stem 52 but upon the compression part of the cycle the valve closure plate 51 may be closed by the pressure of the fluid exerted thereon or may be positively closed by energization of the coil 66 to move the armature 65 and positively move the valve closure plate 51 to closed condition.

Upon the compression portion of the cycle pressure is exerted on the inner face of the valve disc 30 so that it is distorted to the extent necessary to permit delivery to the annular space 42 and therefrom through the passageway 43 to the fluid delivery connection 44.

As the valve 50 is operated, by reason of its location at the center of the head 10, the closure plate 51 and the stem 52 tend to rotate and equalize the wear.

The location of the valve 50 at the center of the head 10 provides a more effective connection for types of pumps in which the face 12 is provided with a plurality of grooves for fluid delivery to the delivery valve 30. Check valves as shown in accordance with the present invention have been found to operate satisfactorily with high compression ratios of the order of one hundred fifty to one.

It will be noted that the check valve construction in accordance with the invention is compact, can be readily removed or replaced, if desired, and yet is of simple construction with a minimum amount of machining required for the results attained.

We claim:

1. A valve construction comprising a head with an inner face and having a valve opening with a shoulder therearound, a valve ring mounted in said opening in engagement with said shoulder, said valve ring having an annular shoulder terminating at an inner face with a central opening therethrough and a plurality of delivery openings around the outer margin of said last mentioned inner face, said valve ring having a recess in an opposite face, valve means in said annular recess and controlling the flow through said plurality of delivery openings, a unitary valve housing having a mounting portion mounted in said valve opening, in engagement with said valve ring, said valve housing having a body with an interior annular fluid passageway at the inner end of said mounting portion and in facing relation to said valve ring, said body having a fluid passageway offset to one side in said body portion connected to said annular fluid passageway and with a fluid outlet connection disposed in one direction for delivery of fluid from said delivery openings, said valve housing body having a central passageway closed at its outer end and communicating with said central opening, said central passageway having a fluid inlet connection disposed in an opposed direction to said outlet connection, said central passageway having a valve stem guide mounted therein, a valve having a stem in said guide guide and having a disc shaped closure member for engagement with said last mentioned inner face for closing said cental opening, said last mentioned inner face being closely spaced with respect to said inner face of said head to accommodate said closure member with the delivery openings communicating with the edge of said closure member, and a resilient member in said central passageway urging said stem away from a seated position with said disc shaped closure member disengaged from said inner face of said ring.

2. A valve construction as defined in claim 1 in which said valve opening is at the center of said head.

3. A valve construction as defined in claim 1 in which said valve stem guide includes a spider inserted in said central opening.

References Cited by the Examiner
UNITED STATES PATENTS

| | | | |
|---|---|---|---|
| 1,416,771 | 5/22 | Babson et al. | 137—525.3 |
| 2,160,860 | 6/39 | Gustafson | 230—31 |
| 2,274,338 | 2/42 | Cody | 230—24 |
| 2,373,046 | 4/45 | Osborn | 137—493.6 XR |
| 2,555,005 | 5/51 | Warneke | 230—24 |
| 2,908,287 | 10/59 | Augustin | 137—525.3 |
| 3,055,390 | 9/62 | Scheldorf | 137—525 XR |

LAVERNE D. GEIGER, *Primary Examiner.*

ISADOR WEIL, *Examiner.*